(12) United States Patent
Shan (10) Patent No.: US 9,934,165 B2
(45) Date of Patent: Apr. 3, 2018

(54) APPARATUS FOR MONITORING DATA ACCESS TO INTERNAL MEMORY DEVICE AND INTERNAL MEMORY DEVICE

(71) Applicant: MONTAGE TECHNOLOGY (SHANGHAI) CO., LTD., Shanghai (CN)

(72) Inventor: Gang Shan, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 69 days.

(21) Appl. No.: 14/979,532

(22) Filed: Dec. 28, 2015

(65) Prior Publication Data
US 2016/0342533 A1    Nov. 24, 2016

(30) Foreign Application Priority Data

May 19, 2015    (CN) .......................... 2015 1 0255829

(51) Int. Cl.
    *G06F 12/14*    (2006.01)
    *G06F 13/42*    (2006.01)
    *G06F 13/16*    (2006.01)

(52) U.S. Cl.
    CPC ...... *G06F 12/1433* (2013.01); *G06F 13/1673* (2013.01); *G06F 13/4234* (2013.01); *G06F 2212/1052* (2013.01)

(58) Field of Classification Search
    CPC ............. G06F 12/1433; G06F 13/1673; G06F 13/4234; G06F 2212/1052; G06F 12/14; G06F 21/16; G06F 13/16; G06F 13/42; G06F 21/78

USPC ......................................... 711/163, 164, 170
See application file for complete search history.

(56) References Cited

U.S. PATENT DOCUMENTS

| 8,869,273 | B2* | 10/2014 | Srivastava | G06F 21/554 726/22 |
| 9,015,832 | B1* | 4/2015 | Lachwani | G06F 21/52 726/22 |
| 9,491,136 | B2* | 11/2016 | Paunikar | H04L 29/12367 |
| 9,558,128 | B2* | 1/2017 | Anderson | G06F 12/1416 |

(Continued)

*Primary Examiner* — Pierre Miche Bataille
(74) *Attorney, Agent, or Firm* — Jun He Law Offices P.C.; James J. Zhu (57) ABSTRACT

The application discloses an apparatus for monitoring data access to internal memory device and an internal memory device. The internal memory device is coupled to a memory controller via a memory bus. The monitoring apparatus includes a buffer memory module and a security control module. The buffer memory module is configured to couple with the memory bus to receive and store data exchanged via the memory bus and/or a data access command and a destination address associated with the exchanged data. The security control module is configured to process the exchanged data and/or the data access command and the destination address stored in the buffer memory module to identify the existence of security risk in the data access to the internal memory device. The monitoring apparatus will not affect the operation of the internal memory device, and thus is fully compatible with the conventional system architecture. Moreover, by monitoring the data access to the internal memory device, potential security risks can be identified to improve the security and stability of the system.

30 Claims, 4 Drawing Sheets

(56) References Cited

U.S. PATENT DOCUMENTS

| | | | |
|---|---|---|---|
| 2009/0024627 A1* | 1/2009 | King | G06F 21/554 |
| 2012/0204265 A1* | 8/2012 | Judge | G06F 21/554 726/24 |
| 2016/0205116 A1* | 7/2016 | Sang | G06F 21/554 726/25 |
| 2016/0292599 A1* | 10/2016 | Andrews | G06Q 10/0635 |

* cited by examiner

APPARATUS FOR MONITORING DATA ACCESS TO INTERNAL MEMORY DEVICE AND INTERNAL MEMORY DEVICE

CROSS REFERENCE TO RELATED APPLICATIONS

This application claims priority to Chinese Patent Application Number 201510255829.0 filed on May 19, 2015, the entire content of which is incorporated herein by reference.

TECHNICAL FIELD

The application generally relates to memory technology, and particularly to an apparatus for monitoring data access to an internal memory device and an internal memory device including such apparatus.

BACKGROUND

Rapid development of internet technology enables interconnection and communication of network devices such as computers, mobile terminals, etc. People can easily obtain information through the interconnected devices. However, while information access is facilitated, problems relating to data and information security become increasingly prominent. The interconnected devices may be easily attacked by external unauthorized devices, either accidentally or maliciously, thereby causing damage, disclosure or tampering of internal data. Conventional computer security systems generally use security software to monitor and screen the security risks, but the software monitoring may have latency compared with the occurrence of the security risks. When an unauthorized program or command is detected by the software, the system data may have been damaged or disclosed already.

Thus, there is a need to improve the conventional computers or other electronic devices to improve their data security.

SUMMARY

One objective of the application is to improve conventional computers or electronic devices to improve their data security and system stability.

In a first aspect of the application, there is provided an apparatus for monitoring data access to an internal memory device. The internal memory device is coupled to a memory controller via a memory bus. The apparatus comprises a buffer memory module coupled to the memory bus to receive and store data exchanged via the memory bus and/or a data access command and a destination address associated with the exchanged data; and a security control module configured to process the exchanged data and/or the data access command and the destination address stored in the buffer memory module to identify the existence of security risk in the data access to the internal memory device.

In certain embodiments, the security control module comprises: a pre-processing unit configured to pre-process the exchanged data and/or the data access command and the destination address stored in the buffer memory module, and a control unit configured to further process a pre-processed result of the exchanged data and/or the data access command and the destination address to identify the existence of security risk in the data access to the internal memory device.

In certain embodiments, the pre-processing unit is further configured to compare the exchanged data stored in the buffer memory module with reference data to determine whether the exchanged data comprises the reference data; and the control unit is further configured to determine the existence of security risk in the data access according to the determination result of whether the exchanged data comprises the reference data.

In certain embodiments, the pre-processing unit is configured to classify the stored data according to a predetermined data classification rule; and the control unit is configured to determine the existence of security risk in the data access according to the data classification result of the stored data.

In certain embodiments, the pre-processing unit is configured to identify a behavioral mode of the data access to the internal memory device according to a predetermined data access behavior identification rule; and the control unit is configured to determine the existence of security risk in the data access according to the data access behavior identification result.

In certain embodiments, the pre-processing unit is configured to compare the destination address with a reference address space to determine whether the destination address is within the reference address space; and the control unit if configured to determine the existence of security risk in the data access according to the determination result of whether the destination address is within the reference address space.

In certain embodiments, the control unit is further configured to configure the pre-processing unit to incorporate a security risk identification rule therein.

In certain embodiments, the pre-processing unit is implemented by an application specific processing logic circuit.

In certain embodiments, the control unit is implemented by an embedded processor or a general purpose processor.

In certain embodiments, the security control module is implemented by an embedded processor or a general purpose processor, and wherein the security control module is configured with a security risk identification rule.

In certain embodiments, the security control module comprises a data storage unit configured to store a security risk identification rule and/or security risk identification result.

In certain embodiments, the security control module is further configured to determine whether or not to perform a security control operation according to the identification result of the existence of security risk in the data access to the internal memory device.

In certain embodiments, the security control operation comprises restricting the data access to the internal memory device.

In certain embodiments, the security control module restricting the data access to the internal memory device comprises: the security control module being configured to prohibit the internal memory device exchanging data with the memory controller via the memory bus; or the security control module being configured to providing replacement data to the memory bus to replace the exchanged data in a subsequent data exchanging process.

In certain embodiments, the internal memory device comprises a command/address processing module configured to receive the data access command and the destination address associated with the exchanged data from the memory bus and to control the data access to the internal memory device according to the data access command and the destination address; and wherein the security control module is configured to couple with the command/address processing module and to restrict the data access to the internal memory device through the command/address processing module upon identification of the existence of security risk in the data access to the internal memory device.

In certain embodiments, the internal memory device comprises a data buffering module through which a memory module of the internal memory device exchanges data with the memory bus; and wherein the security control module is configured to couple with the data buffering module and to restrict the data access to the internal memory device through the data buffering module upon identification of the existence of the security risk in the data access to the internal memory device.

In certain embodiments, the security control module is further configured to generate a security warning signal according to the identification result of the existence of security risk in the data access to the internal memory device.

In certain embodiments, the apparatus further comprises a communication port through which the security control module communicates with a module external to the apparatus.

In certain embodiments, the buffer memory module is a FIFO memory.

In certain embodiments, the apparatus further comprises: a monitoring interface through which the apparatus is coupled to the memory bus; a data buffering module coupled between the buffer memory module and the monitoring interface and configured to buffer the data received from the memory bus and provide it to the buffer memory module; and a command/address processing module coupled between the buffer memory module and the monitoring interface and configured to receive the data access command and the destination address associated with the exchanged data from the memory bus and provide the data access command and the destination address to the buffer memory module.

In certain embodiments, the monitoring interface is in accordance with the standard of the memory interface of internal memory device.

In certain embodiments, the command/address processing module is further configured to obtain a chip selecting signal indicating which group of memory chips of the internal memory device being monitored is selected for the data access, and to associate the chip selecting signal and the destination address with the exchanged data.

In certain embodiments, the buffer memory module and the data buffering module is in distributed structure or in centralized structure.

In certain embodiments, the apparatus is integrated with the internal memory device on a single circuit board and coupled to the memory bus via a memory interface of the internal memory device.

In certain embodiments, the internal memory device comprises a memory module and a data buffering module coupling with each other, and the memory module exchanges data with the memory interface through the data buffering module; and wherein the buffer memory module comprises a first portion coupled to the data buffering module in a path different from that between the memory module and the data buffering module, and/or a second portion coupled to the command/address processing module of the internal memory device.

In certain embodiments, the data buffering module and the buffer memory module and the memory module coupled with the data buffering module are in distributed structure or in centralized structure.

In certain embodiments, the command/address processing module is further configured to control the buffer memory module to store the exchanged data and/or the data access command and the destination address associated therewith.

In a second aspect of the application, there is provided an internal memory device. The internal memory device comprises a memory module; a memory interface through which the memory module is coupled to a memory bus to receive a data access command and a destination address from the memory bus and exchange data with the memory bus; a data buffering module coupled between the memory module and the memory interface and configured to buffer data exchanged therebetween; a command/address processing module configured to receive from the memory interface the data access command and the destination address; a buffer memory module coupled to the data buffering module and configured to receive and store the data buffered by the data buffering module; and/or coupled to the command/address processing module and configured to receive and store the data access command and the destination address associated with the buffered data; and a security control module configured to process the data and/or the data access command and the destination address stored by the buffer memory module to identify the existence of security risk in the data access to the internal memory device.

In a third aspect of the application, there is provided a computer system of an electronic device comprising the monitoring apparatus according to the first aspect of the application or the internal memory device of the second aspect of the application.

In a further aspect of the application, there is provided a method for monitoring data access to an internal memory device. The internal memory device is coupled to a memory controller via a memory bus. The method comprises: receiving and storing data exchanged via the memory bus and/or a data access command and a destination address associated with the exchanged data; and processing the exchanged data and/or the data access command and the destination address stored in the buffer memory module to identify the existence of security risk in the data access to the internal memory device.

From the foregoing, the monitoring apparatus of the embodiments of the application can monitor the data access to the internal memory device by intercepting the delivered data and access control information such as data access commands and destination addresses, thereby identifying the potential security risks. The monitoring operation of the monitoring apparatus will not affect the normal operation of the internal memory device, and thus it can be fully compatible with the system architecture of conventional computers and electronic devices. Moreover, for the identified security risks, an access control mechanism can be adopted in the internal memory device being monitored or the memory controller to restrict the insecure data access, thereby avoiding unauthorized invocation or modification of the data in the internal memory device, as well as improving the security and stability of the system.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the application. It should be understood that, the various aspects of the application described and graphically presented herein may be arranged, replaced, combined, divided and designed in many different configurations, and these different configurations are implicitly included in the application.

Figure 1:
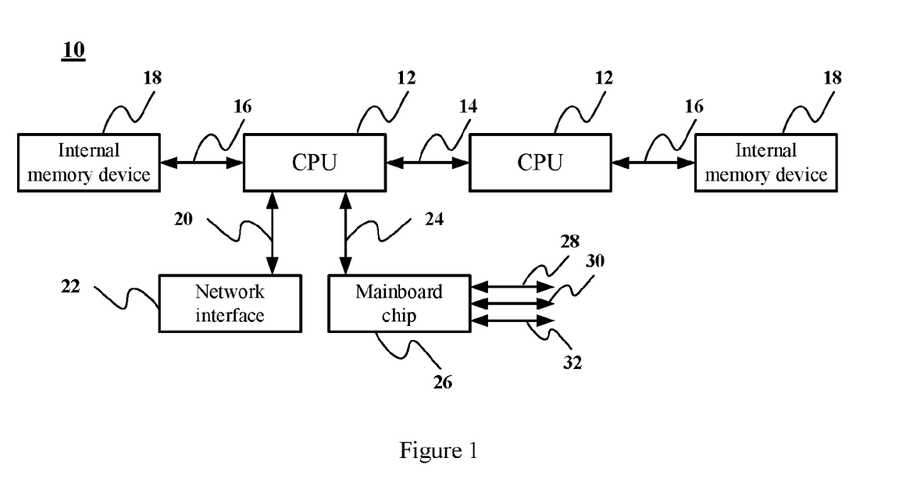
FIG. 1 illustrates a block diagram of a conventional server architecture.

The inventor of the application has found that a memory bus is the key component of a system architecture for a computer system, a mobile terminal or other smart electronic devices. FIG. 1 illustrates a block diagram of a conventional computer system architecture. As illustrated in FIG. 1, the computer system (e.g., a server) has two central processing units (CPU) 12 that communicate with each other via a QPI bus 14. Each CPU 12 is coupled to an internal memory device 18 via a memory bus 16 (e.g., DDR3, DDR4 memory buses, etc.), coupled to a network interface 22 via a PCIE interface 20 (further to the Internet), and coupled to a mainboard chip 26 via a DMI interface 24. The mainboard chip 26 also has other interfaces such as a SAS interface 28, a SATA interface 30, and a USB interface 32 to couple with low-speed components (not shown).

During the normal operation of the computer system 10, instructions and non-instruction data on which the running of programs depends are stored in the internal memory device 18. Thus, data processing operations performed by the computer system 10 in FIG. 1 are generally implemented by the CPU 12 accessing to the internal memory device 18 via the memory bus 16. The inventor has found that communication via the memory bus 16 has characteristics of broadcast communication. In other words, data transmitted from a device obtaining the control of the memory bus can be received by all the other devices coupled to the memory bus 16. By utilizing such characteristics, the data access to the internal memory device 18 can be monitored by intercepting the data and access control information such as data access commands and destination addresses delivered by the memory bus 16 in real time, to identify the potential security risks. Furthermore, for the identified security risks, an access control mechanism may be adopted in the internal memory device 18 being monitored or a memory controller to restrict the insecure data access, thereby avoiding unauthorized invocation or modification of the data in the internal memory device 18, as well as improving the security and stability of the system.

Figure 2:
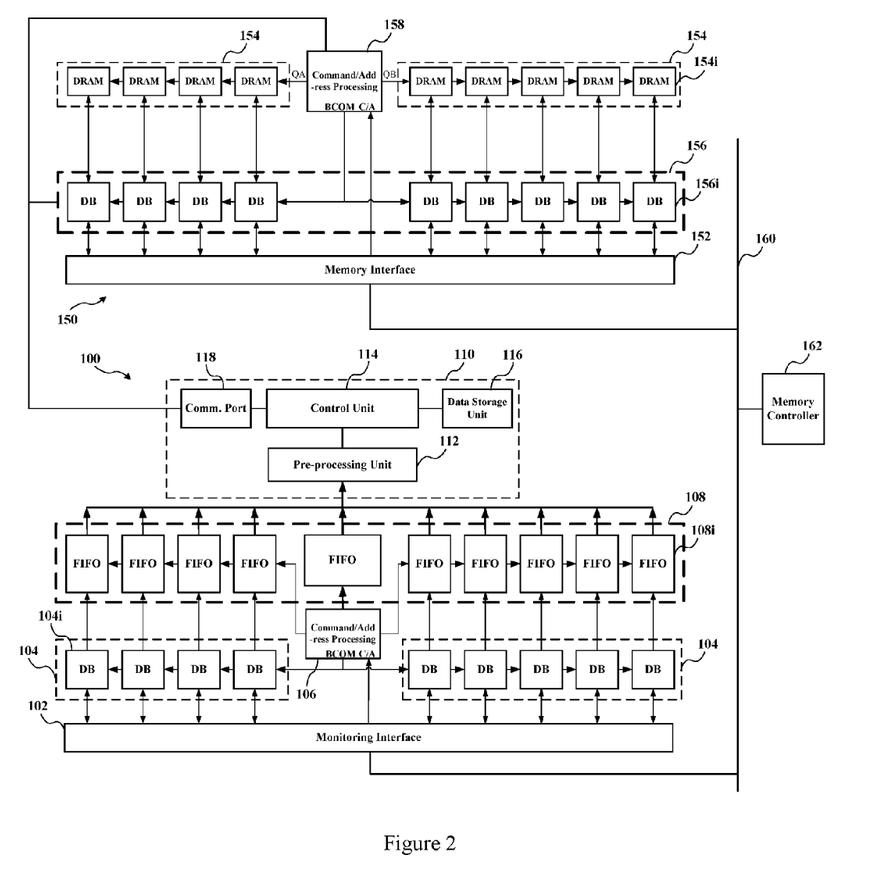
FIG. 2 illustrates an apparatus for monitoring data access to an internal memory device according to an embodiment of the application.

FIG. 2 illustrates an apparatus 100 for monitoring data access to an internal memory device 150 according to an embodiment of the application. The internal memory device 150 may be used in computer systems, smart mobile terminals or other similar electronic devices. The internal memory device 150 may be coupled to a memory bus 160 of an electronic device via a memory interface 152, and further to a memory controller 162 via the memory bus 160. The memory bus 160 generally includes a data bus section for data delivery and a command/address bus section for delivering control signals including commands and addresses. Under the control of the memory controller 162, the internal memory device 150 can exchange data with the memory controller 162 via the memory bus 160, or further exchange data with other modules of the electronic device. In certain embodiments, the memory controller 162 may be integrated within a mainboard chipset of the electronic device, or within a CPU of the electronic device. In some other embodiments, the memory controller 162 may be implemented as a single module.

In certain embodiments, the internal memory device 150 may be an internal memory device in accordance with the JEDEC Double Data Rate (DDR) Synchronous Dynamic Random Access Memory (SDRAM) standard, including the JEDEC DDR, DDR2, DDR3, DDR4 and other DDR standards. Accordingly, the memory bus 160 and the memory controller 162 are also in accordance with these memory standards. Moreover, the internal memory device 150, the memory bus 160 and the memory controller 162 may also be in accordance with other standards or protocols such as the SDRAM or RAMBUS memory standards.

Specifically, the internal memory device 150 has a memory module 154. In certain embodiments, the memory module 154 of the internal memory device 150 may be selected from volatile memory (e.g. RAM), non-volatile memory (e.g. Flash memory) or the combination thereof. In the embodiment illustrated in FIG. 2, the memory module 154 is exemplarily shown to have one or more sets of memory chips 154*i* in a distributed structure, and each set of memory chips 154*i* forms a physical bank (or rank) with a data width equal to that of the memory bus 160 or the CPU (not shown). For example, the embodiment shown in FIG. 2 is applicable to DDR4 memory standard whose standard data width is 64 bits. Nine memory chips 154*i* are shown in FIG. 2, each having a data width of eight bits, and thus the set of memory chips 154*i* has a data width of 72 bits. Eight of the 72 bits are parity bits and the other 64 bits are for data delivery. It will be appreciated that the memory module 154 may have a centralized structure. In the following, the monitoring apparatus of the application is described with reference to examples of the internal memory device 150 having the distributed memory module, however, people skilled in the art can understand that it should not be construed as limiting the scope of the application. The internal memory devices using the centralized structure can also be monitored similarly.

The internal memory device 150 further includes a data buffering (DB) module 156 coupled between the memory interface 152 and the memory module 154 to buffer the data exchanged therebetween. Corresponding to the one or more sets of memory chips with the distributed structure, the data buffering module 156 also includes one or more data buffering sub-modules 156i, and each corresponds to a memory chip 154i. Moreover, the internal memory device 150 further includes a command/address processing module 158. The command/address processing module 158 may receive the data access commands and the destination addresses from the memory controller 162 via the memory interface 152, and control the data buffering module 156 to exchange data between the memory module 154 and the memory interface 152 (further the memory bus 160) according to the received data access commands and the destination addresses.

Specifically, the command/address processing module 158 is coupled to the memory interface 152 via a command/address channel, to receive the command/address signal from the memory bus 160. The command/address signal is generally provided by the memory controller 162, which contains the data access command and the destination address. For the memory interface 152 in accordance with the DDR4 standard, the command/address channel may include pins A0-A17, pins BG0-BG1 and/or pins BA0-BA1. The pins BG01-BG1 are used to determine which memory bank group of the memory module 154 is selected to be accessed, e.g. being written into or read from. The pins BA0-BA1 are used to determine which memory bank is selected to be accessed, and the pins A0-A17 are used for addressing and determining which memory cell in a selected memory bank is selected to be accessed. All these pins may be used to determine the destination address. Moreover, inputs to three pins A16 (RAS_n), A15 (CAS_n) and A14 (WE_n) are also used to determine the input data access commands such as the read command, write command and other predefined control commands. The command/address processing module 158 also receives other access control signals, e.g. a chip select signal, via the other pins. The chip select signal can be used to control selecting one set of memory chips from multiple memory chips for data exchange. The detailed descriptions of the DDR3 and DDR4 standards, and the signals and interfaces fit for the command/address processing module and the data buffering module can be referred to the JEDEC standard "DDR SDRAM" published in September, 2012 by the JEDEC, and the datasheet "DDR4 Data Buffer M88DDR4DB02" published in January, 2015, the datasheet "DDR4 Registering Clock Driver M88DDR4RCD02" published in October, 2014 and the datasheet "Memory Buffer for DDR3 Load Reduced DIMM M88MB6000" published in December, 2012 by Montage Technology. The contents of the documents are incorporated into the application in entirety by reference.

In some embodiments, the command/address processing module 158 may be a single chip on the circuit board of the internal memory device 150, and in some other embodiments, the command/address processing module 158 may be integrated with the data buffering module 156 in the same chip.

Still referring to FIG. 2, the monitoring apparatus 100 is also coupled to the memory bus 160, and thus coupled to the memory controller 162 and the internal memory device 150 via the memory bus 160. In some embodiments, the monitoring apparatus 100 may have a structure similar to the circuit board structure of the internal memory device 150, and may be inserted into a memory slot of the electronic device, thereby coupling with the memory bus 160 directly. Such hardware structure facilitates the coupling and decoupling of the monitoring apparatus with the electronic device being monitored, and is fully compatible with the conventional electronic devices. In some other embodiments, the monitoring apparatus may be integrated into the mainboard of the electronic device to couple with the memory bus 160 directly. It will be appreciated that the monitoring apparatus 100 may be coupled to the memory bus 160 indirectly. For example, the monitoring apparatus 100 may be coupled to the memory bus 160 via a memory interface of the internal memory device being monitored, which will be elaborated in the following paragraphs.

In the embodiments shown in FIG. 2, the monitoring apparatus 100 is exemplarily structured as a single hardware, which may have a monitoring interface 102 similar to the memory interface 152 of the internal memory device 150 and in accordance with the memory standard of the internal memory device 150 and the memory bus 160, e.g. the DDR SDRAM standard. The monitoring apparatus 100 is coupled to the memory bus 160 via the monitoring interface 102. The monitoring apparatus 100 further includes a data buffering (DB) module 104, which is coupled to the monitoring interface 102 to buffer data from the memory bus 160. Moreover, the monitoring apparatus 100 further includes a command/address processing module 106, which is coupled to the monitoring interface 102 to receive the data access commands and the destination addresses from the memory bus 160, or further receives other access control signals such as the chip select signal. The data access command and the destination address are associated with the exchanged data, which specifically indicates what kind of data access operations is to be performed to the internal memory device 150, as well as which memory cell is to be selected for data access operation, etc.

In some preferred embodiments, the structures of the data buffering module 104 and the command/address processing module 106 may have a structure the same as or similar to those of the data buffering module 156 and the command/address processing module 158 of the internal memory device 150, respectively, thereby being more compatible with the standard and signal formats of the internal memory device 150. For example, the data buffering module 104 may have a distributed structure similar to the distributed structure of the data buffering module 156, which includes one or more sets of data buffering sub-modules 104i. Alternatively, the data buffering module 156 may have a centralized structure, i.e. having only one data buffering sub-module.

Similar to the command/address processing module 158 of the internal memory device 150, the command/address processing module 106 is coupled to the monitoring interface 102 via the command/address channel to receive the command/address signal from the memory bus 160. For the monitoring interface 102 in accordance with the DDR4 standard, the command/address channel may include pins A0-A17, BG0-BG1 and/or BA0-BA1. The inputs to the pins A16 (RAS_n), A15 (CAS_n) and A14 (WE_n) are also used to determine the input data access command such as the read command, the write command and other predefined control commands. In some embodiments, the command/address processing module 106 may only be used to receive and forward the data access command and the destination address. In some other embodiments, the command/address processing module may perform certain data processing operation on the receive data access command and/or the destination address, e.g. format conversion, coding/decoding, etc, and then provide the processed data access command and/or destination address to other modules. For example, when the command/address processing module 106 receives the destination address for the data access operation, the row address and column address of a memory rank of the destination address may be delivered by time-division multiplexing some pins of the pins A0-A17. Under such circumstances, the command/address processing module 106 may combine the row address, the column address and other address and control information (e.g. the memory rank address, the memory bank group address, and/or the chip select signal indicating which set of memory chips is selected) received at different times together to determine the memory cell being accessed.

Still referring to FIG. 2, the monitoring apparatus 100 has a buffer memory module 108, which is coupled to the data buffering module 104 to receive the data from the memory bus 160 and buffered by the data buffering module 104. The buffer memory module 108 is also coupled to the command/address processing module 106 to receive the data access command and the destination address, and/or other control signals. The buffer memory module 108 may store the data, the data access command and the destination address it received for further data processing, analysis and statistics. The buffer memory module 108 may use the first-input-first-output (FIFO) structure, the last-input-first-output (LIFO) structure or other structures. Preferably, the buffer memory module 108 may use the FIFO structure. The buffer memory module 108 using the FIFO structure can receive data at a first port and transmit data at a second port for further security identification, thereby having high efficiency.

In the embodiment shown in FIG. 2, the buffer memory module 108 may include two parts. A first part of the buffer memory module 108 is of the distributed structure similar to the data buffering module 104, having a set of buffer memory sub-modules 108*i*. Each of the set of buffer memory sub-modules 108*i* may be coupled to a data buffering sub-module 104*i* to receive and store data provided by the data buffering sub-module 104*i*. A second part of the buffer memory module 108 may be coupled to the command/address processing module 106 to receive and store the data access command and the destination address. It will be appreciated that the buffer memory module 108 may also be structured as a centralized structure, rather than the distributed structured shown in FIG. 2. In certain embodiments, the buffer memory module 108 may receive and store data only, and not receive and store the data access command and the destination address. Under such circumstances, the buffer memory module 108 may include the first part coupled to the data buffering module 104 only, and not include the second part coupled to the command/address processing module 106. In some other embodiments, the buffer memory module 108 may receive and store the destination address and the data access command only, and not receive and store data. Accordingly, the buffer memory module 108 may include the second part coupled to the command/address processing module 106 only. In some embodiments, each buffer memory sub-module of the buffer memory module 108 with distributed structure may be coupled to the command/address processing module 106 directly or indirectly, to store data from the corresponding data buffering sub-module 104*i* under the control of the command/address processing module 106, for example, to store data synchronously. It will be appreciated that the buffer memory module with centralized structure may be coupled to both the data buffering module 104 and the command/address processing module 106, to store the data provided by the data buffering module 104 under the control of the command/address processing module 106.

Still referring to FIG. 2, the monitoring apparatus further include a security control module 110, which is coupled to the buffer memory module 108 to process the exchanged data and/or the data access command and the destination address stored in the buffer memory module 108 to identify the existence of security risk in the data access to the internal memory device 150. For example, the security control module 110 may search in the data stored in the buffer memory module 108 for feature data or reference data which indicates restricted data or non-restricted data. If the restricted feature data or reference data ("blacklist") is found, then it is deemed that security risk exists, and no security risk exists otherwise. Alternatively, if the non-restricted feature data or reference data ("white list") is found, then it is deemed that no security risk exists. The search for the feature data or reference data may be performed on data collected in one or more data access operations to the internal memory device 150, or data collected in the data access operations within a period. For another example, the security control module 110 may compare the stored destination address with a predefined address space indicating a storage region of the internal memory device 150 that is restricted or allowed to be accessed, e.g. a storage region for storing instructions. If the destination address is within the predefined address space restricted to be accessed, it is deemed that security risk exists, and no security risk exists otherwise. Alternatively, if the destination address is within the predefined address space allowed to be access, then it is deemed that no security risk exits.

As described above, the reason that the data access to the internal memory device 150 can be monitored by the monitoring apparatus 100 is because the monitoring apparatus 100 and the internal memory device 150 are both coupled to the memory bus 160. Data delivered via the memory bus 160, including data written into and read from the internal memory device 150, can be sent to the memory bus 160. Due to the characteristic of broadcast communication of the memory bus 160, data sent to the memory bus 160 can be received by all devices or modules coupled to the memory bus 160. Thus, the data exchanged between the internal memory device 150 and the memory bus 160, the data access command and the destination address can all be received by the monitoring apparatus 100. Furthermore, the monitoring apparatus 100 may process the data and other information it received, or identify the behavior of the data access operation, to determine the potential security risks.

In some embodiments, according to the received data access command and destination address, the monitoring apparatus 100 may store data in a manner similar to that of the internal memory device 150, i.e. data is mirrored into the buffer memory module 108 of the monitoring apparatus 100. The buffer memory module 108 may be reset at predefined intervals, for example, all cells of the buffer memory module 108 are reset to "0" or "1". In some other embodiments, the monitoring apparatus 100 may store the destination address, the data access command and data in a manner different from that of the internal memory device 150. For example, a database can be constructed, wherein each data unit of the database may include the destination address, the data access command and the associated data.

As described above, in applications, the internal memory device 150 may have multiple sets of memory chips 154i. When accessing the internal memory device 150, the memory controller 162 may provide the chip select signal for selecting one set from the multiple sets of memory chips 154i for data accessing, and the unselected sets of memory chips 154i may not respond to the data access request or command. In this condition, the command/address processing module 106 of the monitoring apparatus 100 may be configured to respond to the command/address signal to receive data associated therewith, regardless of the specific value of chip select signal. Moreover, the monitoring apparatus 100 may also obtain the chip select signal, and determine which set of memory chips 154i is selected for data accessing according to the chip select signal. For example, the chip select signal may be directly provided to the monitoring apparatus 100 by the memory controller 162, for example, via a specific port. For another example, since the data content stored in different sets of memory chips 154i of the internal memory device 150 is different, while the data access operation is generally directed to certain storage address corresponding to the specific data content. Thus, it may be determined which sets of memory chips is selected according to the data access command. Consequently, the monitoring apparatus 100 may execute an algorithm to retrieve the chip signal according to the data access command and the destination address. Then the command/address processing module 106 may further associate the chip select signal with the destination address and the exchanged data. In this way, the data access operations to different destination addresses of different sets of memory chips 154i can be uniquely determined, thereby the internal memory device 150 is monitored more efficiently. Especially when multiple internal memory devices 150 are coupled to the memory bus 160 or the internal memory device 150 has multiple sets of memory chips 154i, the monitoring apparatus 100 can distinguish the data accesses to different internal memory devices 150 or to different sets of memory chips 154i of the internal memory device(s) 150 according to the chip select signal.

Still referring to FIG. 2, the security control module 110 may include a pre-processing unit 112 and a control unit 114. The pre-processing unit 112 is coupled to the buffer memory module 108 to receive and pre-process the stored data and/or the data access command and destination address. The control unit 114 is coupled to the pre-processing unit 112 to further process a pre-processed result of the exchanged data and/or the data access command and the destination address to identify the existence of security risk in the data access to the internal memory device 150. The pre-processing performed by the pre-processing unit 112 reduces the size of data to be processed, thereby reducing the load or pressure of data processing of the control unit 114. In this way, the control unit 114 may be implemented by general processor(s) or embedded processor(s). The embedded processor may be a digital signal processor, an embedded micro processor or an embedded micro controller, for example. As the pre-processing unit 112 need to process a huge amount of data, it may be implemented by application specific processing logic, e.g. ASIC or FPGA circuits. The application specific processing logic can be designed according to the features and formats of the data processing, and thus it may be more efficient in processing. Generally speaking, the overall data processing capability of the pre-processing unit 112 and the control unit 114 should be designed to satisfy the requirement for monitoring the data stored by the monitoring apparatus 100, and match with the size of the buffer memory module 108. It will be appreciated that the pre-processing unit 112 and the control unit 114 may be combined as a single unit, which may be implemented by a general processor or an embedded processor. In this condition, the data processing capability of the general process or the embedded processor should also satisfy the requirement for monitoring the data stored by the monitoring apparatus 100.

According to the monitoring requirements, the security control module 110 may be configured with various security risk identification rules to identify the corresponding security risks. In some embodiments, these security risk identification rules may be configured within the pre-processing unit 112, for example, by the control unit 114. In some other embodiments, the security risk identification rule may be configured within the security control module 110 in cases that the security control module 110 uses the general processor or embedded processor. The security control module 110 may include a data storage unit 116 such as a non-volatile memory (e.g. flash memory or PROM memory) to store the security risk identification rule. When the system needs to monitor the data access, the control unit 114 may obtain the security risk identification rule stored in the data storage unit 116 and configure it in the pre-processing unit 112. In applications, the security risk identification rule stored in the security control module 110 may be configured during initialization of the system or the monitoring apparatus 100, or be updated or modified during the monitoring process.

In some embodiments, the pre-processing unit 112 may be configured to have reference data, and further configured to compare the stored data with the reference data to determine whether the stored data includes the reference data. The pre-processing unit 112 may be implemented as a multi-bit digital comparator or a data comparing software or program. Accordingly, the control unit 114 determines the existence of security risk in the data access according to the determination result of whether the stored data includes the reference data. For example, if the stored data includes the reference data restricted to be accessed, then it is deemed that security risk exists in the data access.

In some embodiments, the pre-processing unit 112 may be configured with a predefined data classification rule, which includes one or more predefined data ranges indicating different classes of data to be monitored. For example, the predefined data range defines the values of certain bits for a standard-width data, while the remaining bits may be arbitrary values. The pre-processing unit 112 may classify the data stored in the buffer memory module 108 according to the predefined data classification rule, and generate corresponding data classification results. The pre-processing unit 112 may be implemented as a multi-bit digital comparator or a data comparing software or program. For example, the data classification result may include frequency or number of occurrences of data of different classes. According to the data classification result, the control unit 114 may determine whether security risk exists in the data access based on the classification result of the pre-processing unit 112. For example, if the frequency or number of occurrences of data of certain class exceeds a predetermined threshold, then it is deemed that security risk exists in the data access.

In some embodiments, the pre-processing unit 112 may be configured with a predefined data access behavior identification rule. For example, the data access behavior identification rule may define various behaviors of the data access according to the frequency, number, interval or other parameters of the data access to certain address or address space. Furthermore, different behaviors may be classified into different security levels such as normal access or abnormal access. The pre-processing unit 112 may identify the behavior of the data access to the internal memory device 150 according to the predefined data access behavior identification rule. Accordingly, the control unit 114 may determine whether security risk exists in the data access according to the identified behavior of the data access. For example, if the frequency of the data access to certain storage address or address space in a period exceeds a predetermined threshold, it is deemed that the behavior of the access is abnormal, i.e. security risk exists.

For example, the data access identification rule may define the behavior of the following data access as abnormal data access: in step 1, data is written into a first address space; in step 2, data is read from the first address space; in step 3, data is repeatedly (e.g. every 1 ms) written into the first data address space; and in step 4, data is written into a second address space storing key data which is generally non-editable. Some attacking programs or hack programs may use such data access procedure to attack the computer system, trying to modify the key data. The unauthorized modification to the key data may affect the stability of the system. Utilizing the previously-configured data access identification rule, the security control module 110 may identify whether the data access to the internal memory device 150 corresponds to the behavior of the abnormal data access according to the stored destination address and the data access command. If it is determined that steps 1-3 have been sequentially executed in a data access operation, then the security control module 110 may determine that the behavior of the data access operation corresponds to the abnormal data access. Accordingly, the security control module 110 may continue to perform a security control operation, to prohibit the data write operation to the second address space of step 4 in a period. In contract, for the secure or normal programs authorized by the system, they may only perform steps 1, 2 and 4 or step 4, rather than performing the above four step sequentially. Thus, the security control module 110 may identify that the behavior of the secure program is normal, and then may not prohibit the data access to the second address space. It will be appreciated that the above definition of the behavior of data access and corresponding behavior identification is exemplary only. In applications, the system administrator or other security manager may design and define the data access behavior identification rule according to actual behavior of the attacking programs. For example, the data access behavior identification rule may be defined by combining the sequence, frequency and/or number of the data write or read operation with the destination addresses, or further with the data allowed or restricted to be accessed.

In some embodiments, the pre-processing unit 112 may be configured to have a reference address space, and further compare the stored destination address with the reference address space to determine whether the stored destination address is within the reference address space. The pre-processing unit 112 may be implemented as a multi-bit digital comparator or a data comparing software or program. Accordingly, the control unit 114 determines whether security risk exists according to the comparison result of whether the stored destination address is within the reference address space. If the destination address is within the reference address space that is restricted to be accessed, then it is deemed that security risk exists in the data access.

It should be noted that the above security risk monitoring or identification rules or strategies are merely exemplary and not construed as limiting the scope of the application. People skilled in the art can understand that different security risk monitoring and identification rules can be designed according to actual requirement of security monitoring, and executed by the security control module 110.

In some embodiments, the security control module 110 may record the security risk identification result into the data storage unit 116, for example. The security control module 110 may send out the security risk identification result. For example, the security control module 110 may send the security risk identification result to the command/address processing module 106, and then the command/address processing module 106 may send the security risk identification result to the memory controller 162 via the memory bus 160. For another example, the security control module 110 may have a communication port 118. The security control module 110 may communicate with external modules via the communication port 118, to send out the security risk identification result. For example, the monitoring apparatus 100 may communicate with the CPU or the memory controller 162 via the communication port 118. It will be appreciated that the security control module 119 may perform other operations such as coordinating the monitoring process or obtaining the security risk identification rule via the communication port 118.

In applications, after the security control module 110 has determined that security risk exists in the data access to the internal memory device 150, it may perform some control operations to control the data access or prompt the security risk to the system.

In some embodiments, the security control module 110 may generate a security warning signal according to the identification result of the existence of security risk in the data access to the internal memory device 150. For example, when it is determined that security risk exists, the security control module 110 may generate the corresponding security warning signal. The security control module 110 may be further coupled to some external modules such as the CPU, to provide the security warning signal thereto and further prompt to the user through a display, speaker or the like of an electronic device.

In some embodiments, the security control module 110 may determine whether or not to proceed with the security control operation according to the determination of existence of security risk in the data access to the internal memory device 150. In some embodiments, the security control operation includes restricting the data access to the internal memory device. For example, the security control module 110 may prohibit the internal memory device 150 exchanging data with the memory controller 162 via the memory bus 160. Alternatively, the internal memory device 150 may be controlled to provide replacement data to the memory bus 160 for replacing the exchanged data in subsequent data exchange process.

The security control operation can be performed by different modules. For example, the security control module 110 may be coupled to the command/address processing module 158 or the data buffering module 156 of the internal memory device 150, via the communication port 118, for instance. When security risk exists in the data access to the internal memory device 150, the security control module 110 may generate a control command to restrict the data access to the internal memory device 150 via the command/address processing module 158 or the data buffering module 156.

Figure 3:
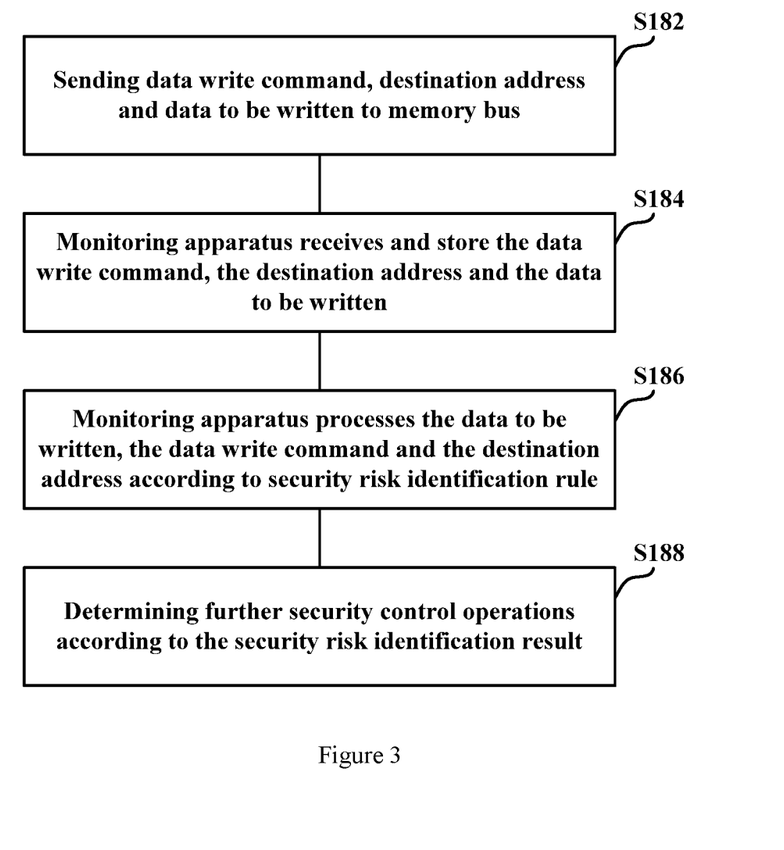
FIG. 3 illustrates a flow chart of a data access monitoring process performed by the monitoring apparatus in FIG. 2.

FIG. 3 illustrates a flow chart of a data access monitoring process performed by the monitoring apparatus in FIG. 2. In the following, the monitoring process of the monitoring apparatus 100 will be elaborated with an example that the memory controller 162 indicates to perform data write operation to the internal memory device 150 by referring to FIGS. 2 and 3.

First, in step S182, the memory controller 162 sends a data write command and an associated destination address to the internal memory device 150 via the memory bus 160. Moreover, the data to be written is also sent to the memory bus 160.

Afterwards, in step S184, the monitoring apparatus 100 receives the data to be written, the data write command and the destination address via the monitoring interface 102. After buffered by the data buffering module 104, the data to be written is stored in the buffer memory module 108. Moreover, the data write command and the destination address are also stored in the buffer memory module 108 after being processed by the command/address processing module.

Then in step S186, the data to be written, the data write command and the destination address stored in the buffer memory module 108 are all provided to the security control module 110. The security control module 110 processes the data access command, the destination address and the associated data according to a predefined security risk identification rule. For example, it may compare the data to be written with reference data or compare the destination address with a predefined address space, to identify potential security risks. The specific operations of the security risk identification can be referred to the previous paragraphs, which will not be elaborated herein.

After that, in step S188, the security control module 110 may determine whether or not to send a warning signal or perform further security control operations according to the security risk identification result.

It will be appreciated that the monitoring apparatus 100 performs the data read operation in a similar manner, with only slight differences. Specifically, during the data write operation, data are sent from the memory controller 162 to the memory bus 160, and the monitoring apparatus 100 receives and stores the data accordingly; while during the data read operation, data are sent from the internal memory device 150 to the memory bus 160, and the monitoring apparatus 100 receives and stores the data accordingly. Therefore, the monitoring process of the data read operation may be referred to that of the data write operation, which will not be elaborated herein.

Figure 4:
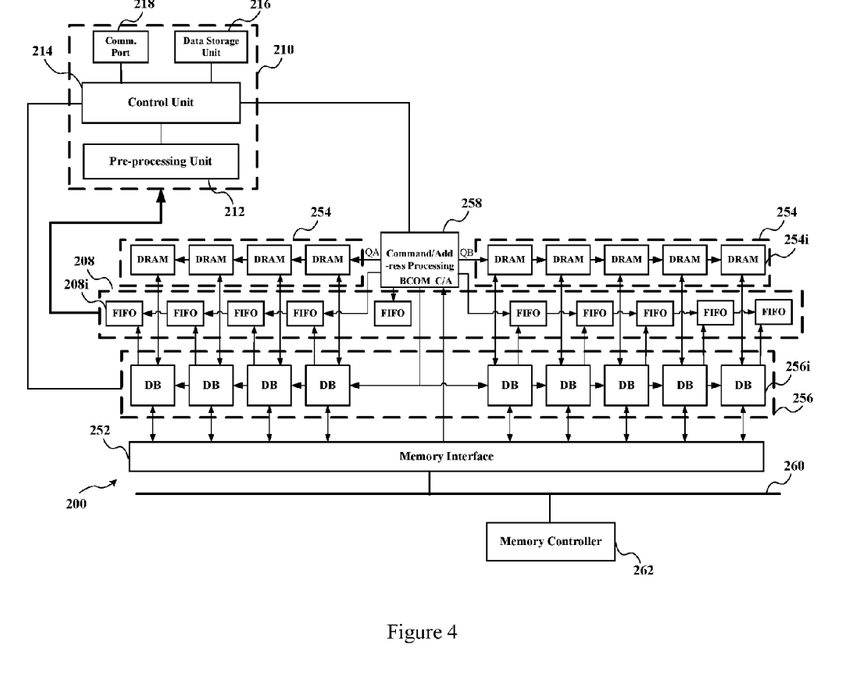
FIG. 4 illustrates an internal memory device with monitoring function according to an embodiment of the application.

In the embodiment shown in FIG. 2, the monitoring apparatus 100 is constructed as a single device or module that can be directly coupled to the memory bus 160. In some other embodiments of the application, the monitoring apparatus may be integrated within the internal memory device and obtain data via the memory interface through which the internal memory device is coupled to the memory bus, to monitor the data access. FIG. 4 illustrates an internal memory device 200 integrated with a monitoring apparatus according to an embodiment of the application.

As illustrated in FIG. 4, the internal memory device 200 is coupled to a memory bus 260 via a memory interface 252, and further coupled to a memory controller 262 via the memory bus 260. In some embodiments, the internal memory device 200 may be an internal memory device in accordance with the JEDEC DDR-SDRAM standard, and accordingly the memory bus 260 and the memory controller 262 are also in accordance with the JEDEC DDR-SDRAM standard. In some other embodiments, the internal memory device 200, the memory bus 260 and the memory controller 262 may be internal memory devices in accordance with other standards or protocols such as the SDRAM and RAMBUS standards.

Specifically, the internal memory device 200 includes a memory module 254. The memory module 254 is exemplarily shown to include one or more sets of memory chips 254$i$ with a distributed structure, and each set of memory chips 254$i$ forms a physical bank or rank with a width equal to that of the memory bus 260 and a CPU (not shown).

The internal memory device 200 further include a data buffering module 256, which is coupled between the memory interface 252 and the memory module 254 to buffer data exchanged therebetween. Corresponding to the one or more sets of memory chips 254$i$ with the distributed structure, the data buffering module 256 also includes one or more data buffering sub-modules 256$i$, and each of the data buffering sub-modules 256$i$ corresponds to a memory chip 254$i$. Moreover, the internal memory device 250 further includes a command/address processing module 258. The command/address processing module 258 may receive data access commands and destination address from the memory controller 262 via the memory interface 252, and control the data buffering module 256 to exchange data between the memory module 254 and the memory interface 252 (and further the memory bus 260) according to the received data access commands and the destination addresses.

The internal memory device 200 further includes a buffer memory module 208, which is coupled to the data buffering module 256 to receive and store the data buffered by the data buffering module 256. Moreover, the buffer memory module 208 is further coupled to the command/address processing module 258 to receive and store the data access commands and destination addresses associated with the buffered data. Thus, the buffer memory module 208 may include a first part coupled to the data buffering module 256, and a second part coupled to the command/address processing module 258. In some embodiments, the buffer memory module 208 may use a FIFO structure. Similarly, each sub-module 208$i$ of the buffer memory module 208 with the distributed structure can be coupled to the command/address processing module 258, either directly or indirectly, to store data from the corresponding data buffering sub-module 256$i$ under the control of the command/address processing module 258, for example, to store data synchronously. It should be noted that, in some cases, the buffer memory module 208 may receive and store data without the control of the command/address processing module 258. For example, the buffer memory module 208 may determine whether or not to store data according to change of signal at an output port of the data buffering module 256.

As data are needed to be read from and written into the memory module 254, the data buffering module 256 and the memory module 254 exchanges data via a bi-directional bus. The buffer memory module 208 may also be coupled to the bi-directional bus. In this way, either data to be written into the memory module 254 from the memory interface 252 or data read from the memory module 254 can be sent to the bi-directional bus. Accordingly, the buffer memory module 208 may monitor the data access and store the received data therein.

The internal memory device 200 further includes a security control module 210, which is coupled to the buffer memory module 208 to process the stored data and/or data access command and destination address, thereby identifying the existence of security risk in the data access to the internal memory device 200. In the embodiment shown in FIG. 4, the security control module 210 includes a pre-processing unit 212, a control unit 214 and a data storage unit 216. The structure and operation of the security control module 210 may be referred to relevant descriptions of the security control module 110 shown in FIG. 2. It should be noted that as the security control module 210 is integrated within the internal memory device 200, the security control module 210 is easier to be coupled to the command/address processing module 258 and the data buffering module 256 for controlling the data access to the internal memory device 200 via the two modules. For example, when it is determined that security risk exists in the data access, the security control module 210 may control the data buffering module 256 not to send data to the memory bus 260, or control the data buffering module 256 to send replacement data (e.g. dummy data) to the memory bus 260 for further data exchange. The data buffer module 256 may have a register to store the replacement data.

It can be seen that as the internal memory device 200 has monitoring function integrated therein, it can only monitor the operation of the internal memory device 200 within which it is included, and cannot monitor other internal memory devices coupled to the memory bus 260. Thus, in some embodiments, the internal memory device 200 further includes a communication port 218. The security control module 210 may communicate with external modules of the internal memory device 200 or other modules of the internal memory device 200 via the communication port 218. For example, the security control module 210 of an internal memory device 200 may communicate with a security control module of another internal memory device (not shown) to coordinate security monitoring operations and share security identification results. For example, the security control module 210 may instruct to detect whether reference data is included in the exchanged data for each data access. If the reference data is detected in an internal memory device, the detection result may be sent to another internal memory device to instruct it to stop searching. Alternatively, if no reference data is detected in an internal memory device, the detection result may be sent to another internal memory device to instruct it to continue searching.

From the foregoing, the monitoring apparatus of the embodiments of the application can monitor the data access to the internal memory device by intercepting the delivered data and access control information such as data access commands and destination addresses, thereby identifying potential security risks. The monitoring operation of the monitoring apparatus will not affect normal operations of the internal memory device, and thus it can be fully compatible with the conventional system architecture of computers and electronic devices. Moreover, for the identified security risks, an access control mechanism can be adopted in the internal memory device being monitored or the memory controller to restrict insecure data access, thereby avoiding unauthorized invocation or modification of the data in the internal memory device, as well as improving security and stability of the system.

Figure 5:
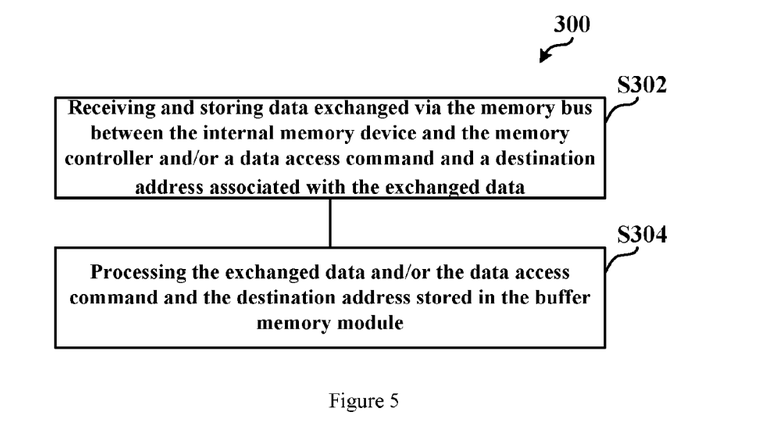
FIG. 5 illustrates a method for monitoring data access to an internal memory device according to an embodiment of the application.

FIG. 5 illustrates a method for monitoring data access to an internal memory device according to an embodiment of the application 300. The monitoring method 300 may be implemented by the monitoring apparatus shown in FIG. 2 or 4. The internal memory device being monitored is coupled to a memory controller via a memory bus.

As shown in FIG. 5, in step S302, data exchanged via the memory bus between the internal memory device and the memory controller and/or a data access command and a destination address associated with the exchanged data is received and stored.

In step S304, the exchanged data and/or the data access command and the destination address stored in the buffer memory module is processed to identify the existence of security risk in the data access to the internal memory device.

In certain embodiments, the exchanged data and/or the data access command and the destination address is received and stored via a monitoring apparatus coupled to a memory bus, for example the monitoring apparatus shown in FIG. 2, together with the internal memory device.

In certain embodiments, the exchanged data and/or the data access command and the destination address is received and stored via a monitoring apparatus integrated within the internal memory device, for example the monitoring apparatus shown in FIG. 4.

In certain embodiments, the method 300 further comprises determining whether or not to perform a security control operation according to the identification result of the existence of security risk in the data access to the internal memory device.

In certain embodiments, the security control operation comprises restricting the data access to the internal memory device via a data buffering module and/or a command/address processing module of the internal memory device.

It should be noted that although several modules or sub-modules of the apparatus for monitoring data access to internal memory device and internal memory device comprising such have been described in the previous paragraphs, such division is exemplary only and not mandatory. Practically, according to the embodiments of the present application, the functions and features of two or more modules described above may be embodied in one module. On the other hand, the function and feature of any one module described above may be embodied in two or more modules.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. An apparatus for monitoring data access to an internal memory device, the internal memory device being coupled to a memory controller via a memory bus, wherein the apparatus comprises:
   a buffer memory module coupled to the memory bus to receive and store data exchanged via the memory bus and/or a data access command and a destination address associated with the exchanged data;
   a security control module configured to process the exchanged data and/or the data access command and the destination address stored in the buffer memory module to identify the existence of security risk in the data access to the internal memory device; and
   wherein the security control module comprises:
      a pre-processing unit configured to pre-process the exchanged data and/or the data access command and the destination address stored in the buffer memory module, and a control unit configured to further process a pre-processed result of the exchanged data and/or the data access command and the destination address to identify the existence of security risk in the data access to the internal memory device.

2. The apparatus of claim 1, wherein the pre-processing unit is further configured to compare the exchanged data stored in the buffer memory module with reference data to determine whether the exchanged data comprises the reference data; and the control unit is further configured to determine the existence of security risk in the data access according to the determination result of whether the exchanged data comprises the reference data.

3. The apparatus of claim 1, wherein the pre-processing unit is configured to classify the stored data according to a predetermined data classification rule; and the control unit is configured to determine the existence of security risk in the data access according to the data classification result of the stored data.

4. The apparatus of claim 1, wherein the pre-processing unit is configured to identify a behavioral mode of the data access to the internal memory device according to a predetermined data access behavior identification rule; and the control unit is configured to determine the existence of security risk in the data access according to the data access behavior identification result.

5. The apparatus of claim 1, wherein the pre-processing unit is configured to compare the destination address with a reference address space to determine whether the destination address is within the reference address space; and the control unit is configured to determine the existence of security risk in the data access according to the determination result of whether the destination address is within the reference address space.

6. The apparatus of claim 1, wherein the control unit is further configured to configure the pre-processing unit to incorporate a security risk identification rule therein.

7. The apparatus of claim 1, wherein the security control module is further configured to determine whether or not to perform a security control operation according to the identification result of the existence of security risk in the data access to the internal memory device.

8. The apparatus of claim 7, wherein the security control operation comprises restricting the data access to the internal memory device.

9. The apparatus of claim 8, wherein the security control module restricting the data access to the internal memory device comprises:
the security control module being configured to prohibit the internal memory device exchanging data via the memory bus with the memory controller; or
the security control module being configured to provide replacement data to the memory bus to replace the exchanged data in a subsequent data exchanging process.

10. The apparatus of claim 8, wherein the internal memory device comprises a command/address processing module configured to receive the data access command and the destination address associated with the exchanged data from the memory bus and to control the data access to the internal memory device according to the data access command and the destination address;
and wherein the security control module is configured to couple with the command/address processing module and to restrict the data access to the internal memory device through the command/address processing module upon identification of the existence of security risk in the data access to the internal memory device.

11. The apparatus of claim 8, wherein the internal memory device comprises a data buffering module through which a memory module of the internal memory device exchanges data with the memory bus;
and wherein the security control module is configured to couple with the data buffering module and to restrict the data access to the internal memory device through the data buffering module upon identification of the existence of the security risk in the data access to the internal memory device.

12. The apparatus of claim 1, wherein the apparatus further comprises:
a monitoring interface through which the apparatus is coupled to the memory bus;
a data buffering module coupled between the buffer memory module and the monitoring interface and configured to buffer the data received from the memory bus and provide it to the buffer memory module; and
a command/address processing module coupled between the buffer memory module and the monitoring interface and configured to receive the data access command and the destination address associated with the exchanged data from the memory bus and provide the data access command and the destination address to the buffer memory module.

13. The apparatus of claim 12, wherein the command/address processing module is further configured to obtain a chip selecting signal indicating which group of memory chips of the internal memory device being monitored is selected for the data access, and to associate the chip selecting signal and the destination address with the exchanged data.

14. The apparatus of claim 13, wherein the command/address processing module is further configured to control the buffer memory module to store the exchanged data and/or the data access command and the destination address associated therewith.

15. The apparatus of claim 1, wherein the apparatus is integrated with the internal memory device on a single circuit board and coupled to the memory bus via a memory interface of the internal memory device.

16. The apparatus of claim 15, wherein the internal memory device comprises a memory module and a data buffering module coupled with each other, and the memory module exchanges data with the memory interface through the data buffering module; and wherein the buffer memory module comprises a first portion coupled to the data buffering module in a path different from that between the memory module and the data buffering module, and/or a second portion coupled to the command/address processing module of the internal memory device.

17. An internal memory device, comprising:
a memory module;
a memory interface through which the memory module is coupled to a memory bus to receive a data access command and a destination address from the memory bus and exchange data with the memory bus;
a data buffering module coupled between the memory module and the memory interface and configured to buffer data exchanged therebetween;
a command/address processing module configured to receive from the memory interface the data access command and the destination address;
a buffer memory module coupled to the data buffering module and configured to receive and store the data buffered by the data buffering module; and/or coupled to the command/address processing module and configured to receive and store the data access command and the destination address associated with the buffered data;

a security control module configured to process the data and/or the data access command and the destination address stored by the buffer memory module to identify the existence of security risk in the data access to the internal memory device; and wherein the security control module comprises:
a pre-processing unit configured to pre-process the data and/or the data access command and the destination address stored in the buffer memory module, and
a control unit configured to further process a pre-processed result of the stored data and/or the data access command and the destination address to identify the existence of security risk in the data access to the internal memory device.

18. The internal memory device of claim 17, wherein the security control module comprises a data storage unit configured to store a security risk identification rule and/or a security risk identification result.

19. The internal memory device of claim 17, wherein the pre-processing unit is further configured to compare the data stored in the buffer memory module with reference data to determine whether the exchanged data comprises the reference data; and the control unit is further configured to determine the existence of security risk in the data access according to the determination result of whether the stored data comprises the reference data.

20. The internal memory device of claim 17, wherein the pre-processing unit is further configured to classify the stored data according to a predetermined data classification rule; and the control unit is configured to determine the existence of security risk in the data access according to the data classification result of the stored data.

21. The internal memory device of claim 17, wherein the pre-processing unit is configured to identify a behavioral mode of the data access to the internal memory device according to a predetermined data access behavior identification rule; and the control unit is configured to determine the existence of security risk in the data access according to the data access behavior identification result.

22. The internal memory device of claim 17, wherein the pre-processing unit is configured to compare the destination address with a reference address space to determine whether the destination address is within the reference address space; and the control unit if configured to determine the existence of security risk in the data access according to the determination result of whether the destination address is within the reference address space.

23. The internal memory device of claim 17, wherein the security control module is further configured to determine whether or not to perform a security control operation according to the identification result of the existence of security risk in the data access to the internal memory device.

24. The internal memory device of claim 23, wherein the security control operation comprises prohibiting the data access to the internal memory device, and the security control module is coupled to the data buffering module and/or the command/address processing module and configured to perform the security control operation via the data buffering module and/or the command/address processing module.

25. The internal memory device of claim 17, wherein the command/address processing module is further configured to control the buffer memory module to store the data and/or the data access command and the destination address associated with the stored data.

26. A method for monitoring data access to an internal memory device, the internal memory device being coupled to a memory controller via a memory bus, wherein the method comprises:
receiving and storing data exchanged via the memory bus and/or a data access command and a destination address associated with the exchanged data; and
processing the exchanged data and/or the data access command and the destination address stored in the buffer memory module to identify the existence of security risk in the data access to the internal memory device;
wherein the processing step comprises:
pre-processing the data and/or the data access command and the destination address stored in the buffer memory module, and
processing a pre-processed result of the stored data and/or the data access command and the destination address to identify the existence of security risk in the data access to the internal memory device.

27. The method of claim 26, wherein the exchanged data and/or the data access command and the destination address is received and stored via a monitoring apparatus coupled to a memory bus with the internal memory device.

28. The method of claim 26, wherein the exchanged data and/or the data access command and the destination address is received and stored via a monitoring apparatus integrated within the internal memory device.

29. The method of claim 26, further comprising:
determining whether or not to perform a security control operation according to the identification result of the existence of security risk in the data access to the internal memory device.

30. The method of claim 29, wherein the security control operation comprises restricting the data access to the internal memory device via a data buffering module and/or a command/address processing module of the internal memory device.

* * * * *